UNITED STATES PATENT OFFICE.

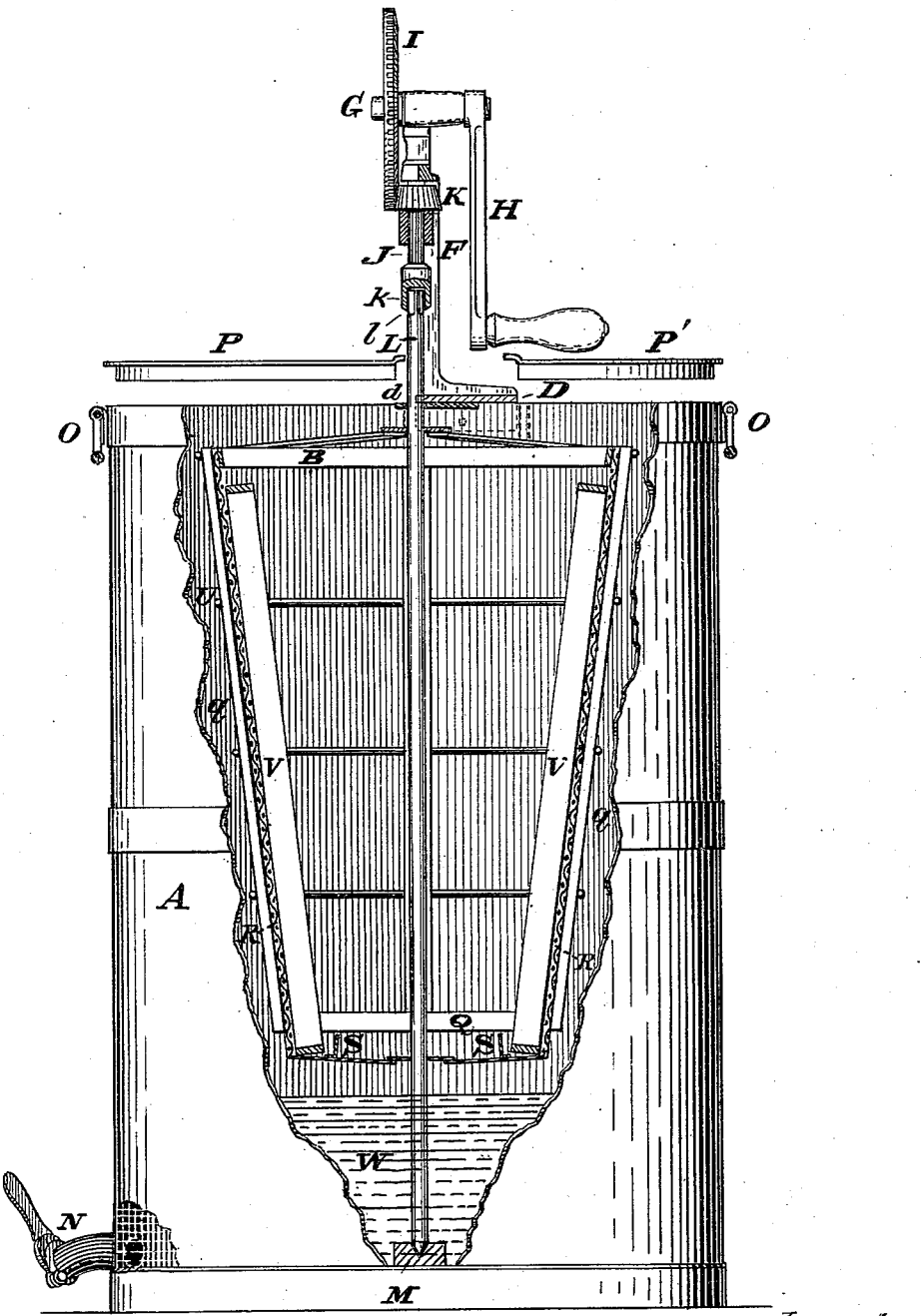

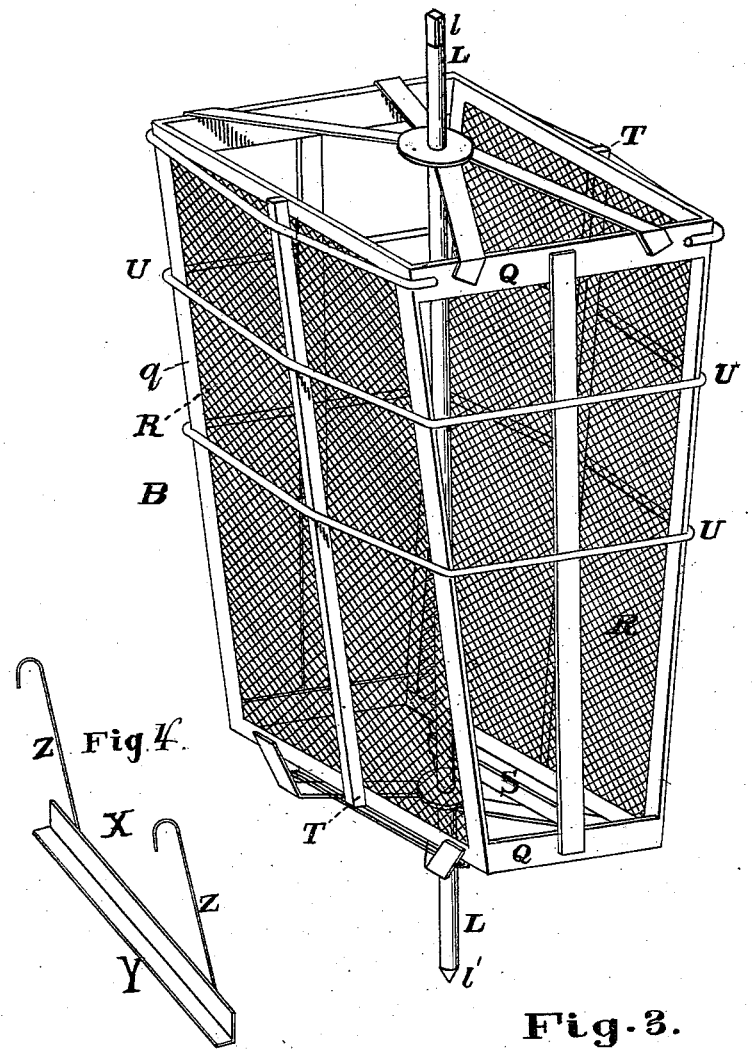
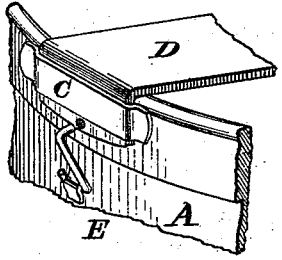

CHARLES F. MUTH, OF CINCINNATI, OHIO.

IMPROVEMENT IN CENTRIFUGAL HONEY-EXTRACTORS.

Specification forming part of Letters Patent No. 208,327, dated September 24, 1878; application filed August 15, 1878.

*To all whom it may concern:*

Be it known that I, CHARLES F. MUTH, of Cincinnati, Hamilton county, Ohio, have invented a new and useful Improvement in Honey-Extractors, of which the following is a specification:

My invention relates to an improvement in those apparatus for the extraction of honey from its comb in which the object is effected by subjecting masses of the full or loaded comb to centrifugal motion of a suitable containing-cage, basket, or holder, which, for this purpose, is journaled within a suitable tank or receptacle; and my invention consists in a form of basket whose sides, adapted to support the congeries of cells constituting the comb side, are inclined somewhat upward and outward, so that even when at rest said sides support the combs at every part without any special fastening, while at the same time the cell-walls, dipping toward their exits, empty with more ease and rapidity and more completely, and with a sufficiently downward discharge to be free from the customary liability to scatter honey over the tank-brim.

In the accompanying drawings, Figure 1 is an axial section of a honey-extractor embodying my invention. Fig. 2 represents my basket or comb-holder detached. Fig. 3 represents a portion of the rim of the tank with its staple and cross-bar. Fig. 4 represents a rack employed for short combs or half-length frames.

A is a cylindrical open-mouthed vessel constituting a tank or receiver, which supports and incloses the honey-comb holder, rack, or basket B, and holds the extracted honey.

Two staples or keepers, C, upon the tank receive the downturned ends of a strong bar or plate, D, which extends across the mouth of the tank. Pins E prevent the displacement of said bar.

The bar D constitutes the base of a pedestal, F, that affords journal-bearing for a horizontal shaft, G, having a crank, H, and a bevel-wheel, I, at its outer and inner extremities, respectively. The cross-bar of the pedestal F also affords journal-bearing for a short vertical shaft, J, whose upper end has a pinion, K, that meshes in said bevel-wheel, and whose lower end has a square socket, $k$, for corresponding head $l$ of the shaft L of my honey-comb basket or supporter B.

The upper portion of my basket-shaft is journaled in an eye, $d$, at the edge of bar D, while its lower extremity, $l'$, rests within a step, M, secured to the center of the tank-floor.

The tank has, at or near its bottom, a discharging-faucet, N, and, at any convenient height on its outside, two opposite handles, O, to enable it to be easily lifted from place to place.

Two segment-shaped covers, P P', serve to close the tank-mouth when not in use.

My improved holder or basket is constructed as follows: A shaft, L, formed of half-inch iron rod, has a head, $l$, of square or other non-circular shape, to fit and occupy a corresponding recess or socket, $k$, in the pinion-shaft K, already described.

Permanently fastened to the shaft L is a cage or frame, Q, of rectangular transverse section, and as open at every part as is consistent with the necessary rigidity, strength, and support of the honey-comb. Two of its opposing sides are vertical, while the other sides, $q$, have such obliquity to the shaft as to lean or incline slightly over, in the manner shown. Each sloping side $q$ is filled with wire cloth or gauze R, of such body and mesh as to sufficiently support the comb in flank, while permitting a free passage of the extracted honey through its interstices.

A curb or flange, S, attached to the open floor of the cage-frame parallel and near to the bottom edge of each sloping side, serves to prevent the displacement of the loaded comb-frame; or the portion of the open floor X adjacent to the sloping side may be deflected downward for that purpose; or, if the inclination of the comb-bearer be not excessive, the open floor may be horizontal throughout, the friction of the lower edge of the comb-frame being then sufficient to keep it from slipping.

A stiff bar or rod, T, secured to each sloping side, and horizontal binders U outside of that, serve to support the gauze filling during the operation.

The basket is constructed of such height and width as to receive in the sloping position honey-comb frames, V, of the desired dimensions.

The shaft L projects sufficiently below the basket proper to elevate the latter above the tank-floor a sufficient distance to afford room at W for about seventy pounds of extracted honey, and the tank is, of course, with this object made as high as the added lengths of the basket proper, and so much of its shaft as projects below it.

The position of the loaded frames is indicated at V in Fig. 1, and it will be seen that it is simply necessary to insert the frame or mass of comb between the flange S and the sloping side of the cage, and permit it to lean against the gauze for it to be sufficiently held and supported without any fastening whatever.

It is also manifest that such leaning position gives the comb-cells a more effective presentation for becoming easily, quickly, and thoroughly depleted of their contents, and that the discharge may be sufficiently downward to avoid waste at the open mouth of the tank.

A departure of ten degrees from the vertical I have found to be an effective position for my slanting comb-supports, but do not absolutely restrict myself to this or any special angle.

The described construction enables the cage to be readily removed from and replaced in the tank.

X represents a rack for use with short combs and half-length frames, and consists of a ledge, Y, and two hangers, Z. In use, the hangers being engaged over the rim of the sloping side, the ledge rests against its inner surface.

I claim as new and of my invention—

1. In a honey-extractor, the rotary rack or comb-bearer B, substantially as represented, having one or more flat upwardly and outwardly inclined wire-cloth sides, R, united to a shaft, L, journaled vertically within a receiver, the whole being formed, arranged, and operating in the manner set forth.

2. The open revolving cage or basket B, having two opposed upwardly and outwardly inclined sides of woven wire, R, and the foot-curbs S, as and for the purposes explained.

In testimony of which invention I hereunto set my hand.

CHAS. F. MUTH.

Attest:
   HARRY E. KNIGHT,
   GEO. H. KNIGHT.